US005616568A

United States Patent [19]
Pouyani et al.

[11] Patent Number: 5,616,568
[45] Date of Patent: Apr. 1, 1997

[54] FUNCTIONALIZED DERIVATIVES OF HYALURONIC ACID

[75] Inventors: Tara Pouyani, Stony Brook; Glenn D. Prestwich, St. James, both of N.Y.

[73] Assignee: The Research Foundation of State University of New York, Albany, N.Y.

[21] Appl. No.: 158,996

[22] Filed: Nov. 30, 1993

[51] Int. Cl.$^6$ .......................... A61K 31/715; C07H 1/00; C07H 5/04; C07H 5/06
[52] U.S. Cl. .......................... 514/54; 514/53; 536/17.2; 536/18.7; 536/55; 536/55.1; 536/55.3; 536/123.1
[58] Field of Search .......................... 514/53, 54; 536/106, 536/123.1, 55, 55.1, 55.3, 17.2, 18.7

[56] References Cited

U.S. PATENT DOCUMENTS

| | | | |
|---|---|---|---|
| 3,798,199 | 3/1974 | Han | 260/49 |
| 4,500,676 | 2/1985 | Balazs et al. | 525/54.2 |
| 4,582,865 | 4/1986 | Balazs et al. | 524/29 |
| 4,636,524 | 1/1987 | Balazs et al. | 514/781 |
| 4,713,448 | 12/1987 | Leshchiner et al. | 536/55.1 |
| 4,736,024 | 4/1988 | Della et al. | 536/55.3 |
| 4,937,270 | 6/1990 | Hamilton et al. | 514/777 |
| 4,957,444 | 9/1990 | Della Valle et al. | 424/401 |
| 5,017,229 | 5/1991 | Burns et al. | 106/162 |

FOREIGN PATENT DOCUMENTS

| | | |
|---|---|---|
| 0216453 | 4/1987 | European Pat. Off. . |
| 9311805 | 6/1993 | WIPO . |

OTHER PUBLICATIONS

T. Pouyani, et al., "Solid–State NMR of N–Acylureas Derived From the Reaction of Hyaluronic Acid With Isotopically–Labeled Carbodiimides," *J. Am. Chem. Soc.* 114, 5972–5976 (1992).

E. Ghezzo, et al., "Hyaluronane Derivative Microspheres As NGF Delivery Devices: Preparation Methods and in Vitro Release Characterization", *International Journal of Pharmaceutics* 87, 21–29 (1992).

H. N. Joshi, et al., "Drug Release From Membranes of Hyaluronic Acid and Its Esters", *Journal of Controlled Release* 20, 109–122 (1992).

N. Yui, et al., "Inflammation Responsive Degradation of Crosslinked Hyaluronic Acid Gels", *Journal of Controlled Release* 22, 105–116 (1992).

D. Swann et al., "Hyaluronic Acid", in *Biomaterials, Novel Materials From Biological Sources*, D. Byrom, ed., Stockton Press 1991, 287–305.

L. M. Benedetti, et al., "Microspheres of Hyaluronic Acid Esters–Fabrication Methods, and *In Vitro* Hydrocortisone Release", *Journal of Controlled Release* 13, 33–41 (1990).

J. A. Hunt, et al., "Diffusion and Drug Release in Polymer Films Prepared From Ester Derivatives of Hyaluronic Acid", *Journal of Controlled Release* 12, 159–169 (1990).

J. Kopecek, "The Potential of Water–Soluble Polymeric Carriers in Targeted and Site–Specific Drug Delivery", *Journal of Controlled Release* 11, 279–290 (1990).

L. B. Dahl, et al., "Preparation of Biologically Intact Radioiodinated Hyaluronan of High Specific Radioactivity: Coupling of $^{125}$I–Tyramine–Cellobiose to Amino Groups After Partial N–Deacetylation", *Analytical Biochemistry* 175, 397–407 (1988).

T. C. Laurent, et al., "Cross–linked Gels of Hyaluronic Acid", *Acta Chem. Scand.* 18, 274–275 (1964).

*Primary Examiner*—Douglas W. Robinson
*Assistant Examiner*—Howard C. Lee
*Attorney, Agent, or Firm*—Hoffmann & Baron

[57] ABSTRACT

Hyaluronate functionalized with dihydrazide is provided and may be cross-linked. A method for producing hyaluronate functionalized with dihydrazide includes mixing hyaluronate and dihydrazide in aqueous solution, then adding carbodiimide so that the hyaluronate and dihydrazide react to form functionalized hyaluronate.

19 Claims, 6 Drawing Sheets

FIG-4A
FIG-4B
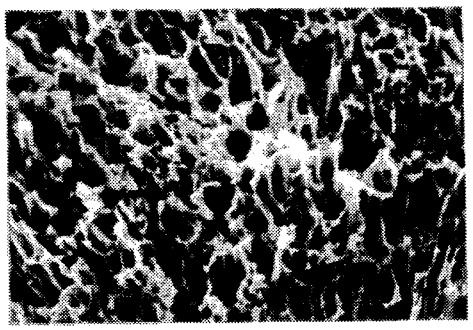

FUNCTIONALIZED DERIVATIVES OF HYALURONIC ACID

BACKGROUND OF THE INVENTION

1. Field of the Invention

The invention relates to chemically modified hyaluronic acid and cross-linked derivatives thereof.

2. Description of the Related Art

Hyaluronic acid (HA) is a viscoelastic biomaterial composed of repeating disaccharide units of N-acetyl-D-glucosamine (GlcNAc) D-glucuronic acid (GlcUA).

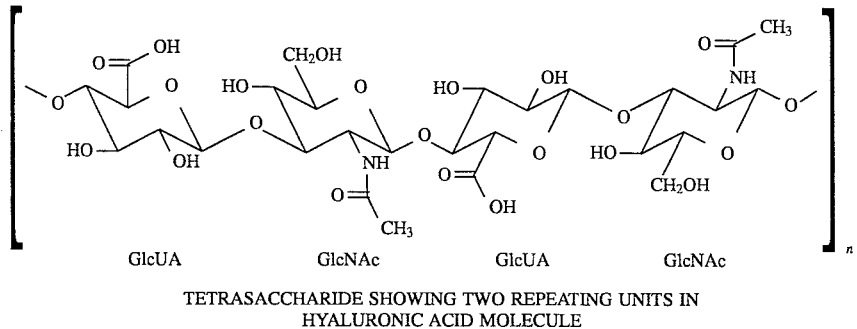

TETRASACCHARIDE SHOWING TWO REPEATING UNITS IN HYALURONIC ACID MOLECULE

HA is a major component of the extra-cellular matrix and participates in a number of important biological processes such as cell mobility, cell differentiation, wound healing and cancer metastasis. Highly purified high molecular weight hyaluronate is used in viscosurgery and viscosupplementation and HA is frequently used as an aid in ophthalmic surgery. The use of hyaluronate is also a potential therapy for osteoarthritis in humans.

In the past, efforts have been directed at chemical modifications of hyaluronate targeting hydroxyl and carboxyl functionalities to obtain specific biomedical polymers. U.S. Pat. Nos. 4,582,865 and 4,713,448 to Balasz and Leshchiner describe respectively, cross-linking HA by reaction with divinyl sulfone and cross-linking HA with glycidyl ether. These reactions are under highly basic conditions. European Patent Application 0216453 published Apr. 1, 1987 describes esterification of hyaluronate salts with alkyl halides in organic media for use in drug delivery. The modified HA species show altered physical characteristics such as decreased solubility in water and increased solubility in organic solvents.

Dahl, et al., Anal. Biochem. 175, 397–407 (1988) and Curvall, et al., Carbohyd. Res. 41, 235–239 (1975) carried out hydrazinolysis of high molecular hyaluronate resulting in N-deacetylation and generation of a free amino group on the hyaluronate backbone. However, extensive degradation of HA resulted. The final products were heterogenous and none were fully characterized by spectroscopic analysis.

A mild and versatile chemical methodology that allows further coupling and crosslinking of HA is still needed. Furthermore, it would be most desirable if the methodology did not compromise the molecular weight integrity of the HA.

Accordingly, it is an object of the invention to provide a mild method for modifying hyaluronic acid without compromising the molecular weight of the HA molecule.

It is another object of the invention to provide a method for crosslinking of HA which can be either irreversible or reversible.

It is a further object to provide functionalized HA with a pendant functional group which acts as a versatile coupling site.

It is yet another object to provide a method for functionalizing and crosslinking HA so that resulting HA gel strength and type can be easily manipulated.

It is still another object to provide HA gels produced by these methods and which are useful for biological, medical, surgical and cosmetic applications.

SUMMARY OF THE INVENTION

The invention is a composition of matter which includes hyaluronate functionalized with a dihydrazide.

The hyaluronate functionalized with dihydrazide may be coupled, through an amine moiety of the dihydrazide, to additional components such as biocompatible materials and biologically active materials, e.g., drugs.

The hyaluronate functionalized with dihydrazide may also be crosslinked and additional component(s) introduced into the matrix. Crosslinking may occur before or after introduction of additional component(s) into the functionalized hyaluronate.

The functionalized hyaluronate and its crosslinked derivatives may be utilized in pharmaceutical compositions which also include a pharmaceutically effective carrier, excipient or diluent.

A method for making a functionalized hyaluronate involves providing hyaluronate in an aqueous solution, mixing the hyaluronate in aqueous solution with a dihydrazide to form a hyaluronate-dihydrazide mixture, adding a carbodiimide to the hyaluronate-dihydrazide mixture and allowing the hyaluronate and dihydrazide to react with each other in the presence of the carbodiimide under conditions producing hyaluronate functionalized with dihydrazide. The hyaluronate functionalized with dihydrazide has a pendant hydrazido group which is useful in subsequent reactions.

Advantageously, a number of manipulations on the HA molecule can proceed from the functionalized hyaluronate. In addition, the mild conditions used throughout prevent degradation of HA. Furthermore, the functionalized or crosslinked HA facilitates subsequent attachment of additional components such as bioeffecting agents including drugs.

The presence of a pendant hydrazido group on the HA molecule offers a number of advantages. The low $pK_a$ of the hydrazido group allows subsequent coupling and crosslinking reactions which can be conducted under conditions of neutral pH that are not detrimental to the molecular weight integrity of the HA molecule.

Because of the low $pK_a$ values of the protonated forms of the dihydrazides, over 90% of the species present have desirable unprotonated amino groups which exist at the pH used in coupling mediated by carbodiimides, thereby increasing the rate and efficiency of intermolecular coupling.

Yet another advantage is that the pendant hydrazido moiety is reactive in aqueous solution at mildly basic pH toward a number of amino specific probes such as, derivatives bearing groups that react specifically with an amino functionality such as N-hydroxysuccinimide (NHS) esters, pentafluorobenzoates, p-nitrobenzoate esters, acyl imidazoles, isothiocyanates, and sulfonyl chlorides or fluorides. These compounds are commercially available or can be readily prepared in the laboratory. Most commonly, activated esters such as p-nitrobenzoates and N-hydroxysuccinimidates are used for this purpose.

Dialdehydes, immunoglobulins or other glycoproteins may be reductively coupled in the presence of, for example, sodium cyanoborohydride at pH 5 to give sugar modified or crosslinked materials.

Still another advantage is that the space between the HA functionalized site and the pendant hydrazido group can be varied as desired depending on what kind of steric assessability is desired for further reactions. Decreasing the spacer length places the reactive group nearer the HA backbone, reducing its reactivity; longer tethers can cause folding of the tether and also reduce activity. For any given tether, an optimal length is expected to exist.

DETAILED DESCRIPTION OF THE INVENTION

Figure 1A:
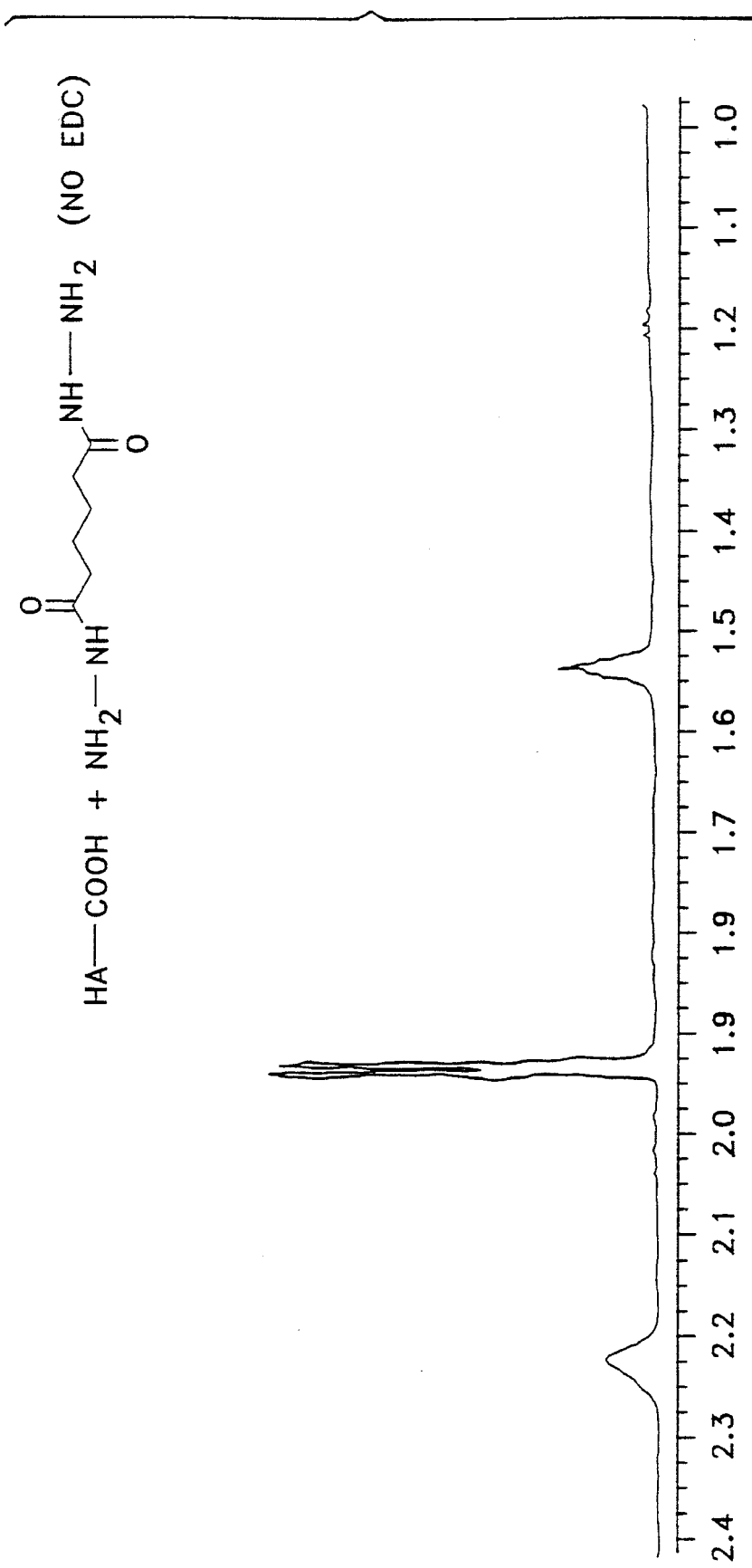
FIG. 1 shows two $^1$H NMR spectra for Example 1b involving an adipic dihydrazide. Panel A shows the admixture of HA hexasaccharide and adipic dihydrazide before adding carbodiimide EDCI. Panel B shows the product HA-adipic dihydrazide adduct obtained after adding EDCI.

The invention involves functionalizing an HA backbone by covalent attachment of pendant hydrazido groups. The hyaluronate is preferably functionalized at carboxyl group sites, that is, at glucuronic acid moieties. Multiple hydrazido groups may be introduced into an HA polysaccharide.

The functionalized HA compositions of the invention form biocompatible gels or hydrogels. The term gel is intended to mean viscous or semi-solid and jelly-like. The term hydrogels is intended to mean macromolecular networks which swell in water. They can be thought of as being composed of hydrophilic monomer units linked to form a soluble polymeric network and eventually crosslinked to form an insoluble network.

The functionalized HA can serve as an intermediate for attachment of bio-effecting agents, drugs, peptides, fluorocarbons, oxygen-carrying agents and other molecules of biological interest.

Hyaluronate is a useful biomedical polymer. Covalently crosslinked derivatives of hyaluronate yield hydrogels that show enhanced rheological and mechanical properties and increased resistance to enzymatic degradation.

Hyaluronate possesses a number of characteristics that make it advantageously used as a drug carrier. It is biocompatible, non-immunogenic, subject to natural degradation by enzymes in the body, and possesses a number of functional groups such as OH, COOH and CH$_2$OH that are amenable to covalent modification. However, hyaluronate is known to be unstable and undergoes degradation below about pH 2 and above about pH 9. The mild reaction conditions used in the invention avoid this degradation. Moreover, the modified products show improved resistance to pH extremes.

Hyaluronic acid is a well known, naturally occurring, water soluble polysaccharide composed of two alternately linked sugars, D-glucuronic acid and N-acetylglucosamine. The polymer is hydrophilic and highly viscous in aqueous solution at relatively low solute concentrations. It often occurs naturally as the sodium salt, sodium hyaluronate. Hyaluronic acid/sodium hyaluronate preparations are often referred to as "hyaluronan" or "HA".

Methods of preparing commercially available hyaluronic acid and salts thereof are well known.

Hyaluronic acid may be represented by formula (I)

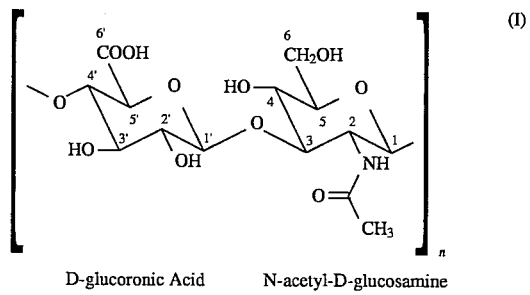

D-glucoronic Acid   N-acetyl-D-glucosamine

For high molecular weight HA, n is often in the range of 100 to 10,000 disaccharide units.

Hyaluronic acid or its salt, that is, sodium hyaluronate, may be referred to herein as HA.

The functionalization of HA may be represented by Scheme 1 below:

SCHEME 1

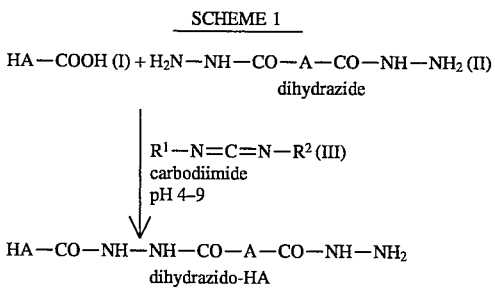

In Scheme 1, A may be considered to be a spacer which is an alkyl, aryl, alkylaryl or arylalkyl, optionally including heteroatoms as discussed below. The carbodiimide $R^1$-N=C=N-$R^2$ is also defined below.

The invention provides a convenient methodology for the covalent attachment of a pendant hydrazido group (—NH—NH$_2$) on the HA backbone. The pendant group allows coupling and crosslinking of HA. The spacer group may include aliphatic chains, alicyclic or aromatic rings and heteroatoms. Its purpose is to allow one hydrazide to react with the HA carboxylate while leaving the second hydrazido group available for further chemical modification.

Our approach was based on the observation that when aliphatic or aromatic diamines were coupled to the HA carboxylate group (MW=1.5×10$^6$ daltons) using carbodiimides such as 1-ethyl-3-(3-dimethylaminopropyl carbodiimide) (EDC) as an activating agent at pH 4.75, the products formed were only N-acylurea adducts of HA and EDC (Pouyani, T., et al, J. Am. Chem. Soc. 114, 5972–5976 (1992)). Based on these results, we documented that the putative O-acylurea intermediates rapidly rearranged to the more stable N-acylurea isomers. We observed a similar phenomenon at the oligomer level using HA fragments ranging in size from 2–6 disaccharide units.

However, we discovered that when dihydrazides are first added to the hyaluronate followed by addition of carbodiimide, the dihydrazide adds to the O-acylurea before it undergoes rearrangement to the more stable N-acylurea.

The dihydrazides useful in the invention may be represented by formula (II):

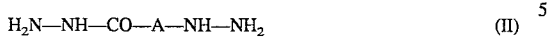

$$H_2N-NH-CO-A-NH-NH_2 \qquad (II)$$

wherein A is hydrocarbyl such as alkyl, aryl, alkylaryl or arylalkyl or A is heterohydrocarbyl which also includes oxygen, sulfur and/or nitrogen atoms in addition to carbon atoms. An alkyl may be branched or unbranched and contain one to 20 carbons or other carbon-sized atoms, preferably 2 to 10, more preferably 4 to 8 carbons or carbon-sized heteroatoms, such as oxygen, sulfur or nitrogen. The alkyl may be fully saturated or may contain one or more multiple bonds. The carbon atoms of the alkyl may be continuous or separated by one or more functional groups such as an oxygen atom, a keto group, an amino group, an oxycarbonyl group and the like. The alkyl may be substituted with one or more aryl groups. The alkyl may in whole or in part, be in form of rings such as cyclopentyl, cyclohexyl, and the like. These non-cyclic or cyclic groups described above may be hydrocarbyl or may include heteroatoms such as oxygen, sulfur, or nitrogen and may be further substituted with inorganic, alkyl or aryl groups including halo, hydroxy, amino, carbonyl, etc. Any of the alkyl groups described above may have double or triple bond(s). Moreover, any of the carbon atoms of the alkyl group may be separated from each other or from the dihydrazide moiety with one or more groups such as carbonyl, oxycarbonyl, amino, and also oxygen and sulfur atoms singly or in a configuration such as —S—S—,—O—CH$_2$-CH$_2$—O—, S—S—CH$_2$CH$_2$— and NH(CH$_2$)$_n$NH—.

Aryl substituents are typically substituted or unsubstituted phenyl, but may also be any other aryl group such as pyrrolyl, furanyl, thiophenyl, pyridyl, thiazoyl, etc. The aryl group may be further substituted by an inorganic, alkyl or other aryl group including halo, hydroxy, amino, thioether, oxyether, nitro, carbonyl, etc.

The alkylaryl or arylalkyl groups may be a combination of alkyl and aryl groups as described above. These groups may be further substituted as described above.

Therefore A in formula II, H$_2$N—CO—NH—A—CO—NH—NH$_2$, can be hydrocarbyl, heterocarbyl, substituted hydrocarbyl substituted heterocarbyl and the like. The term hydrocarbyl as used herein means the monovalent moiety obtained upon removal of a hydrogen atom from a parent hydrocarbon. Representative of hydrocarbyl are alkyl of 1 to 20 carbon atoms, inclusive, such as methyl, ethyl, propyl, butyl, pentyl, hexyl, heptyl, octyl, nonyl, undecyl, decyl, dodecyl, octadecyl, nonodecyl, eicosyl, heneicosyl, docosyl, tricosyl, tetracosyl, pentacosyl and the isomeric forms thereof; aryl of 6 to 12 carbon atoms, inclusive, such as phenyl, tolyl, xylyl, naphthyl, biphenyl, tetraphenyl and the like; aralkyl of 7 to 12 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like; alkenyl of 2 to 10 carbon atoms, inclusive, such as vinyl, allyl, butenyl, pentenyl, hexenyl, octenyl, nonenyl, decenyl, undececyl, dodecenyl, tridecenyl, pentadecenyl, octadecenyl, pentacosynyl and isomeric forms thereof. Preferably, hydrocarbyl has 1 to 20 carbon atoms, inclusive.

The term substituted hydrocarbyl as used herein means the hydrocarbyl moiety as previously defined wherein one or more hydrogen atoms have been replaced with a chemical group which does not adversely affect the desired preparation of the product derivative. Representative of such groups are amino-, phosphino-, quaternary nitrogen (ammonium), quaternary phosphorous (phosphonium), hydroxyl, amide, alkoxy, mercapto, nitro, alkyl, halo, sulfone, sulfoxide, phosphate, phosphite, carboxylate, carbamate groups and the like.

Generally, to obtain dihydrazides, two hydroxy groups of a dicarboxylic acid are substituted with NH$_2$NH$_2$ yielding the dihydrazide. Aliphatic dihydrazides may have formula (a):

$$NH_2NHCO(CH_2)_{n'}CONHNH_2 \qquad (a)$$

wherein n'=1 to 18

Aliphatic dihydrazides useful in the invention include, for example, succinic (butandioic) (n'=2), adipic (hexanedioic) n'=4 and suberic (octanedioic) (n'=6), oxalic (ethanedioic) (n'=0), malonic (propanedioic) (n'=1), glutaric (pentanedioic) (n'=3), pimelic (heptanedioic) (n'=5), azelaic (nonanedioic) (n'=7), sebacic (decanedioic) (n'=8), dodecandioic, (n'=10), brassylic (tridecanedioic), (n'=11), (etc. up to n'=20)

Other dicarboxylic acids include, for example, maleic (HO$_2$CCH=CHCO$_2$H), fumaric (HO$_2$CCH=CHCO$_2$H) and aromatic dicarboxylic acids. Aromatic dihydrazides include terephthalic acid C$_6$H$_4$(COOH)$_2$, yielding

phthalic acid

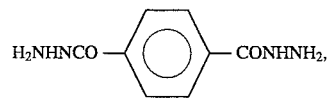

and isophthalic acid

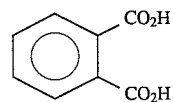

similarly yielding dihydrazides.

The preferred dihydrazides are at least partially soluble in water and include succinic, adipic and suberic dihydrazides; also pimelic, sebacic, tridecane dioic, maleic, fumaric, isophthalic; also malonic, glutaric, azelaic dedecanedioic. For some of these it may be necessary to heat the reaction mixture.

Most preferred because of their commercial availability are adipic and suberic dihydrazides, and also preferred are phthalic dihydrazide and dihydrazides with A containing oxa, thio, amino, disulfide (—CH$_2$—S—S—CH$_2$—), —S(CH$_2$)$_2$S—, —O(CH$_2$)$_n$O— or —NH(CH$_2$)$_n$NH— (n=2 to 4) groups.

The preferred dihydrazides are also weak bases or weak acids having a pK$_a$ for the protonated form, less than about 8, preferably in the range of 1 to 7 and most preferably 2 to 6.

It will be understood that the term pK$_a$ is used to express the extent of dissociation or the strength of weak acids, so that, for example, the pK$_a$ of the protonated amino group of amino acids is in the range of about 12–13 in contrast to the pK$_a$ of the protonated amino groups of the dihydrazides useful herein which is less than about 7.

The carbodiimides useful in the invention may be represented by formula (III):

$$R^1-N=C=N-R^2 \quad (III)$$

wherein $R^1$ and $R^2$ are each independently selected from the group consisting of hydrogen, hydrocarbyl of 1–25 carbon atoms and including substituted - hydrocarbyl, alkoxy, aryloxy, alkaryloxy and the like.

The carbodiimides used in the invention are well known compounds, as represented by the formula (III) given above. Carbodiimides having the formula (III) are preferred where $R^1$ and/or $R^2$ represent more specifically alkyl, cycloalkyl, aryl or substituted forms thereof. Most preferred are carbodiimides which are at least partly water soluble at ambient temperature and up to 80° C. Representative of a preferred class of monofunctional carbodiimides of formula (III) are

- EDCI, or 1-ethyl-3-(3-dimethylaminopropyl) carbodiimide
- N,N'-dicyclohexylcarbodiimide
- N-allyl-N'-(β-hydroxyethyl)carbodiimide
- N-α-dimethylaminopropyl)-N'tert-butylcarbodiimide
- N-(α-dimethylaminopropyl)-N'-(β-bromoallyl)carbodiimide
- 1-(3-dimethylaminopropyl)-3-(6-benzoylaminohexyl)carbodiimide,
- CMC, or cyclohexyl-β-(N-methylmorpholino)ethyl carbodiimide p-toluenesulfonate and the like.

The functionalizations of HA with dihydrazides are preferably carried out under mild conditions including a pH of about 2 to 8 preferably about 3 to 6. The hyaluronate is dissolved in water which may also contain water-miscible solvents such as dimethylformamide, dimethylsulfoxide, and hydrocarbyl alcohols, diols, or glycerols. At least one molar equivalent of dihydrazide per molar equivalent of HA is added. For maximum percentage functionalization, a large molar excess of the dihydrazide (e.g, 10–100 fold) dissolved in water or aqueous-organic mixture is added and the pH of the reaction mixture is adjusted by the addition of dilute acid, e.g., HCl. A sufficient molar excess (e.g., 2 to 100 fold) of carbodiimide reagent dissolved in water, in any aqueous-organic mixture, or finely-divided in solid form is then added to the reaction mixture. It is important that the hyaluronate and dihydrazide be mixed together before addition of the carbodiimide. An increase in pH may be observed after addition of the carbodiimide and additional dilute HCl or other acid may be added to adjust the pH. The reaction is allowed to proceed at a temperature of about 0° C. to about 100° C. (e.g., just above freezing, 0° C., to just below boiling (100° C.)), preferably at or near ambient temperatures for purposes of convenience. The time of the reaction is from about 0.5 to about 48 hours, preferably about one to about five hours with periodic testing and adjusting of the pH until no further change in pH is observed. The pH may then be adjusted to an approximate neutral range and the product, which is hydrazido functionalized hyaluronate, may be concentrated and purified by methods known in the art such as dialysis, rotary evaporation at low pressure and/or lyophilization.

The product may be characterized as viscous or gel-like in aqueous solution at relatively low solute concentrations.

As mentioned above, the pendant hydrazido group may be used for the coupling of other compounds to HA. For example, drugs may be covalently attached through the intermediacy of hydrolytically and/or enzymatically labile bonds. This allows the preparation of controlled release formulations. Such labile linkages include ethers, imidates, thioimidates, esters, amides, thioethers, thioesters, thioamides, carbamates, ethers, disulfides, hydrazides, hydrazones, oxime ethers, oxime esters and amines. Compounds may also be noncovalently associated with the functionalized HA electrostatically or hydrophobically.

The hydrazido functionalized hyaluronate may be crosslinked with cross-linking agents such as Traut's reagent or with any of the large variety of known homobifunctional crosslinkers or heterobifunctional crosslinkers, or compounds like them, as exemplified in Schemes 2 and 3 below. Compounds maybe introduced into the cross-linked functionalized HA before or after cross-linking.

SCHEME 2

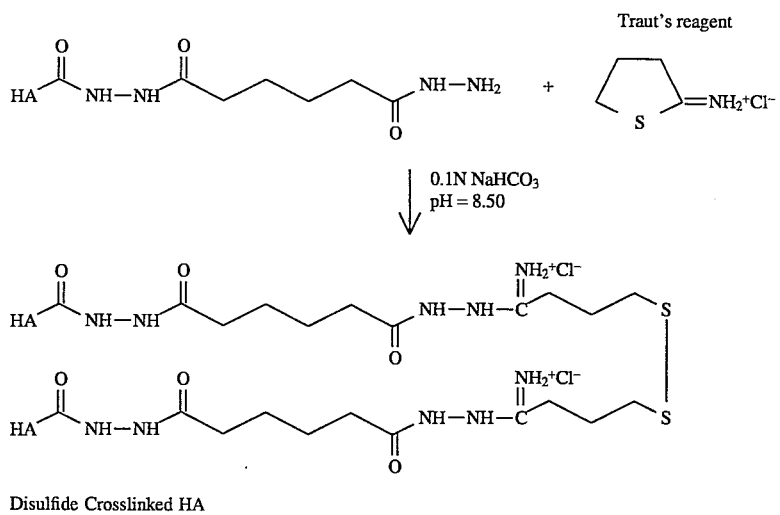

Disulfide Crosslinked HA

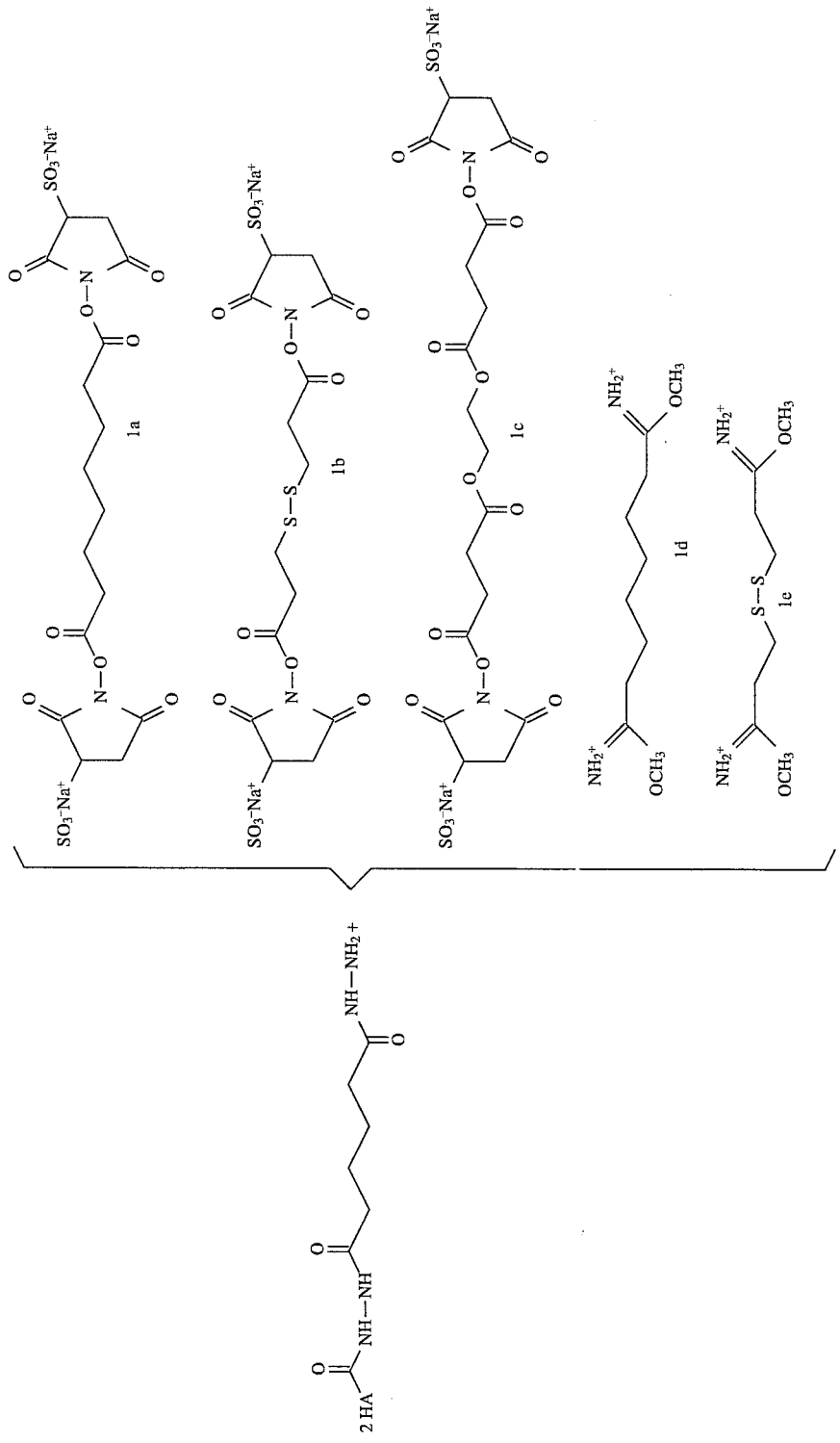

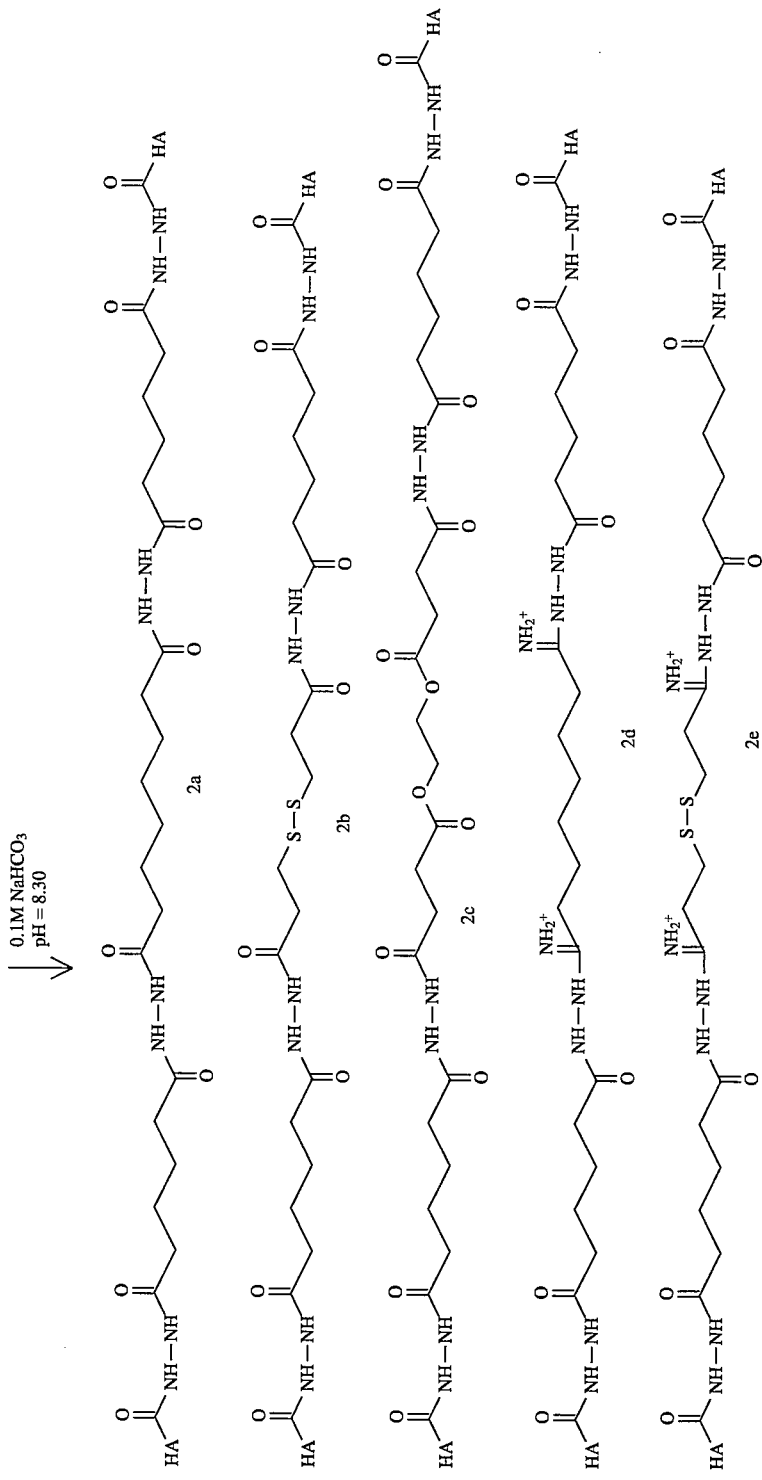

For example, crosslinking agent is dissolved in water or in solid form is added to the hydrazido functionalized HA dissolved in water, with the addition of 0.1N NaHCO$_3$, at about pH 6.5–9.0. The reaction is allowed to proceed typically for a time of one minute to 24 hours, and the cross-linked product recovered.

The functionalized HA or crosslinked HA of this invention may be used as a carrier for a wide variety of releasable biologically active substances having curative or therapeutic value for human or non-human animals. Included among biologically active materials which are suitable for incorporation into the gels of the invention are therapeutic drugs, e.g., anti-inflammatory agents, anti-pyretic agents, steroidal and non-steroidal drugs for anti-inflammatory use, hormones, growth factors, contraceptive agents, antivirals, antibacterials, antifungals, analgesics, hypnotics, sedatives, tranquilizers, anti-convulsants, muscle relaxants, local anesthetics, antispasmodics, antiulcer drugs, peptidic agonists, sympathiomimetic agents, cardiovascular agents, antitumor agents, oligonucleotides and their analogues and so forth. A biologically active substance is added in pharmaceutically active amounts.

Preferred are all anti-inflammatories bearing carboxyl groups such as ibuprofen, naproxen, ketoprofen and indomethacin. Other preferred biologically active sustances are peptides which are naturally occurring, non-naturally occurring or synthetic polypeptides or their isosteres, such as small peptide hormones or hormone analogues and protease inhibitors. Also preferred are spermicides, antibacterials, antivirals, antifungals and antiproliferatives such as fluorodeoxyuracil and adriamycin. These substances are all known in the art.

The term therapeutic drugs is intended to include those defined in the Federal Food, Drug and Cosmetic Act. The United States Pharmacopeia (USP) and the National Formulary (NF) are the recognized standards for potency and purity for most common drug products.

Covalent bonding to reactive therapeutic drugs, e.g., those having reactive carboxyl groups, can be undertaken. For example, first, carboxylate-containing chemicals such as anti-inflammatory drugs ibuprofen or hydrocortisone-hemisuccinate can be converted to the corresponding N-hydroxysuccinimide (NHS) active esters and can further react with a primary amino group of the dihydrazides. Second, non-covalent entrapment of a pharmacologically active agent in cross-linked HA is also possible. Third, electrostatic or hydrophobic interactions can facilitate retention of a pharmaceutically active agent in the modified HA. For example, the hydrazido of the invention can non-covalently interact, e.g., with carboxylic acid-containing steroids and their analogs, and anti-inflammatory drugs such as Ibuprofen (2-(4-iso-butylphenyl) propionic acid). The protonated hydrazido group can form salts with a wide variety of anionic materials such as proteins, heparin or dermatan sulfates, oligonucleotides, phosphate esters, and the like.

The hydrazido-functionalized HA can also be crosslinked to form hydrogels. The cross-linked hyaluronate derivatives are pore-containing matrices wherein biologically active or therapeutically active compounds such as anti-infectives, antiproliferatives, antivirals, peptides, proteins, growth factors, etc. can be physically or chemically incorporated. These compounds will then be subject to sustained release by chemical, enzymatic and physical erosion of the hydrogel and/or the covalent HA-drug linkage over a period of time, providing improved therapeutic benefits of the compounds. This is particularly useful with anti-inflammatories, anti-infectives, spermicidal and anti-tumor agents.

In particular, the cross-linked hyaluronate derivatives have enhanced rheological and mechanical properties as compared with native hyaluronate and provide a particularly good vehicle for joint therapy in patients afflicted with osteoarthritis or rheumatoid arthritis. For this purpose, the preferred biologically active agents are ibuprofen and hydrocortisone, although newer agents for treating osteoarthritis may also be incorporated by covalent linkages.

The chemically crosslinked hyaluronate hydrogels have superior viscoelastic properties as compared with native HA and therefore have use in the prevention of post-surgical adhesion formation. The mechanical properties of the modified HA can prevent fibrin network formation between damaged tissue when a layer of the modified HA is applied to the organ prior to surgery.

For use in tissue engineering, crosslinked biodegradable derivatives of hyaluronate can be produced with defined pore size which may vary according to the choice of crosslinker and mode of preparation of the crosslinker. Pore size and architecture may be determined by scanning electron microscopy. The defined pores can provide support to cells such as keratinocytes, chrondrocytes and osteoblasts which can adhere and subsequently grow in three dimensions for use in skin grafts, nerve repair and cartilage and bone repair. Bioadhesive moieties such as those containing the RGD peptide sequence (Arg-Gly-Asp) can be connected to modified HA via the dihydrazido group and thereby present adherence sites for cells to induce attachment of cells to hyaluronate hydrogel matrices.

Pharmaceutical preparations of this invention may be administered to animals, including mammals, fish, reptiles, and avians, more preferably to mammals including humans, horses, livestock, cattle; poultry; and household pets including cats and dogs.

The pharmacological preparations of this invention can be processed in accordance with conventional methods to produce medicinal agents for administration to patients, e.g., mammals including humans.

The compounds of this invention can be employed in admixture with conventional excipients, i.e., pharmaceutically acceptable organic or inorganic carrier substances suitable for parenteral or topical application which do not deleteriously react with the active compounds. Suitable pharmaceutically acceptable carriers include but are not limited to water, salt solutions, alcohols, gum arabic, vegetable oils, benzyl alcohols, polyethylene glycols, gelatine, carbohydrates such as lactose, amylose, or starch, magnesium stearate, talc, silicic acid, viscous paraffin, perfume oil, fatty acid monoglycerides and diglycerides, pentaerythritol fatty acid esters, hydroxymethyl cellulose, polyvinyl pyrrolidone, merely to name a few. The pharmaceutical preparations can be sterilized and if desired mixed with auxiliary agents, e.g., lubricants, preservatives, stabilizers, wetting agents, emulsifiers, salts for influencing osmotic pressure, buffers, coloring, flavoring and/or aromatic substances and the like which do not deleteriously react with the active compounds. They can also be combined where desired with other active agents, e.g., vitamins.

For parenteral application, particularly suitable are injectable, sterile solutions, preferably oily or aqueous solutions, as well as suspensions, emulsions, or implants including suppositories.

For topical application, there are employed as non-sprayable forms, viscous to semi-solid or solid forms comprising a carrier compatible with topical application and having a dynamic viscosity preferably greater than water. Suitable formulations include but are not limited to solutions, suspensions, emulsions, creams, ointments, powders, liniments, salves, aerosols, etc., which are, if desired, sterilized or mixed with auxiliary agents, e.g., preservatives, stabilizers, wetting agents, buffers, or salts for influencing osmotic pressure, etc.

It will be appreciated that the actual preferred amounts of active compound in a specified case will vary according to the specific compound being utilized, the particular compositions formulated, the mode of application, and the particular situs and organism being treated. Dosages for a given host can be determined using conventional considerations, e.g. by customary comparison of the differential activities of the subject compounds and of a known agent, e.g., by means of an appropriate convention pharmacological protocol.

Generally active components may be included in an amount of 0.01% to 100% active compound, preferably between 2% to 50%. The dosage may be determined analogously with known commercially available HA preparations such as HYVISC® or ORTHOVISC® and Healon®.

Hyaluronic acid is well understood to be useful as a moisturizing and lubrication agent in skin creams, shampoos and a variety of cosmetic applications. For these uses, many additional biocompatible or biologically inert materials may be incorporated into the gels. Biocompatible means non-toxic or non-damaging to human and non-human tissue. These additional materials include humectants, i.e., substances having affinity for water such as glycerine, propylene glycol or isopropanolpropylene glycol, organic or inorganic salts such as quaternary ammonium compounds and zinc salts, enzymes, peptides, alcohols such as benzyl alcohol or lower aliphatic alcohols, polymer latices, fillers such as silica and talc, oils such as mineral oil, castor oil and petrolatum, wetting or dispersing agents or surfactants such as block copolymers of ethylene oxide and propylene oxide to reduce adherence to skin, dyes, fragrances, pigments, antisolar or UV absorbing agents such as actinoquinol, anthranilates, cinnamates, benzyl and homomenthyl salicylate, para-aminobenzoic acid and its ester derivatives, zinc oxide and titanium dioxide, topical medicaments such as methylsalicylate, nicotinates, capsaicin and menthol, anti-acne medicaments such as benzoyl peroxide, resorcinol and retinoic acid, topical antibacterials such as silver sulfadiazine, tetracycline and cefazolin, skin hydrating agents such as sodium pyrrolidine carboxylic acid and other compounds such as fatty acids having about 2 to about 24 carbon atoms which change the rheological properties of the modified HA.

It is apparent from this list of biocompatible materials that the gels of the invention may be used for cosmetic treatments and dressings.

Substrates may be used to provide reinforcement, a gas or liquid barrier, or protection for the area of treatment. The HA gel may be spread onto a backing or substrate. Substrates or backings can include a virtually unlimited variety of materials including, e.g., resins such as polymer films metal foils, woven and non-woven webs of natural and synthetic fibers. Resins include polymer films such as polyester, polyvinyl alcohol, polyvinylchloride and the like. The HA itself maybe a substrate.

The following non-limiting examples illustrate the invention.

The following abbreviations are used in the examples:

DCC—dicyclohexylcarbodiimide
EDC—1-ethyl-3-(3-dimethylaminopropyl)carbodiimide
BS$^3$—bis(sulfosuccinimydyl)suberate
DTSSP—3,3'-dithiobis (sulfosuccinimidylpropionate)
DMS—dimethyl suberimidate—sulfo EGS (2 HCl sulfo-EGS-ethylene glycolbis (sulfosuccinimidylsuccinate)

General Experimental: High resolution 1D and 2D $^1$H spectra were recorded on a Bruker AMX-600 MHz spectrometer. Chemical shifts are given in ppm using residual H$_2$O (4.80 ppm) as an internal standard, unless otherwise indicated. Water suppression was achieved by low-power selective irradiation of the H$_2$O resonance for 1.5–2.0 s. Hyaluronic acid was obtained as the commercially available sodium salt (sodium hyaluronate). Ibuprofen, hydrocortisone-hemisuccinate, hyaluronidase (type VI-S), adipic dihydrazide, succinic dihydrazide, dicyclohexylcarbodiimide (DCC), 1-ethyl-3-(3-dimethylaminopropyl)carbodiimide (EDC) and N-hydroxysuccinimide, suberic dihydrazide, homobifunctional crosslinkers bis(sulfosuccinimidyl) suberate (BS$^3$), 3,3'-dithiobis(sulfosuccimidylpropionate) (DTSSP), dimethyl suberimidate 2HCl (DMS), and ethylene glycolbis(sulfosuccinimidylsuccinate) (sulfo-EGS) were all commercially obtained. HA fragments of defined length were generated by either limited or exhaustive digestion with testicular hyaluronidase and were separated, purified, and characterized. HA oligosaccharides were assayed using the carbazole method (Balasz, E.A., et al., Anal. Biochem. 12, 547–558 (1965) with glucuronolactone as the standard. Biogel P-2, Biogel P-6, and Bigel P-30 were purchased from BioRad.

EXAMPLE A

Preparation of HA Oligomers. Hyaluronate fragments of defined length were generated primarily by exhaustive digestion with testicular hyaluronidase starting with high MW HA (M$_r$ approx. 1.5×10$^6$ daltons). Testicular hyaluronidase degrades HA to generate a series of even numbered oligosaccharides with the N-acetyl-glucosamine moiety placed at the reducing terminus, Incubation of a solution of 1.0 g of high MW HA in 0.5M NaOAc buffer in 0.15M NaCl (pH=5.50) with testicular hyaluronidase for 24 hr at 37° C. resulted in the formation of a non-viscous mixture of HA oligosaccharides. These digestion conditions are optimal for the formation of oligosaccharides ranging in size from 2 to 6 disaccharide units.

The HA oligomers were separated by gel filtration chromatography on Biogel P-6 (240×1.5cm) using pyridinium acetate (pH =6.50) as eluant. The fractions were assayed for glucuronic acid content by the automated carbazole method using glucuronolactone as the standard. A column profile was generated based on this data and the fractions corresponding to each disaccharide unit were pooled. Further characterization of the fragments was accomplished by HPLC on an amino-modified silica gel column using 0.1M KH$_2$PO$_4$ buffer (pH =4.75) as the mobile phase. This column allows the separation of HA fragments up to six disaccharide units. The HPLC traces of the pooled fractions (compared with those of known standards) verified the length of the oligosaccharides and indicated that the fragments exhibited a high degree of homogeneity.

EXAMPLE 1

Functionalization of HA fragments. The preparation of tethered HA derivatives is outlined in Scheme 4:

SCHEME 4

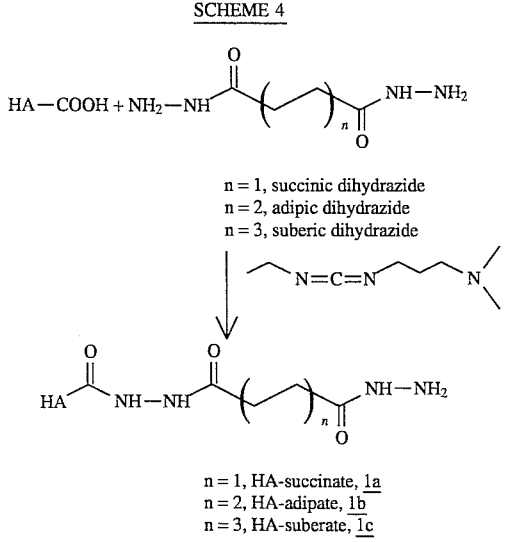

n = 1, succinic dihydrazide
n = 2, adipic dihydrazide
n = 3, suberic dihydrazide n = 1, HA-succinate, 1a
n = 2, HA-adipate, 1b
n = 3, HA-suberate, 1c

Coupling Reaction

General procedure for coupling of HA with dihydrazides: Fragments of hyaluronate prepared in EXAMPLE A (typically 10–15 mg) were dissolved in water to a concentration of 4 mg/mL. To this mixture was added a 20–40 fold molar excess of dihydrazide. The pH of the reaction mixture was adjusted to pH 3–6 by addition of 0.1N HCl. A four-fold molar excess of EDC was dissolved in ca 1 mL of water and added to the reaction mixture. An increase in pH was typically observed after addition of the carbodiimide. The pH of the reaction was maintained below 6 for carbodiimide reactions by addition of 0.1 N HCl, and the reaction was allowed to proceed at room temperature for 2 hours or until no further change in pH was observed. The pH of the reaction mixture was then adjusted to 7.0 with 0.1N NaOH, concentrated in vacuo, redissolved in 1 mL $H_2O$ and applied directly to a column of Biogel P-2 (30×1.5 cm). The mixture was chromatographed using water as eluant at a flow rate of 30 mL/hr. Typically, 40 fractions of 2 mL each were collected and assayed for glucuronic acid content using the carbazole method. Fractions that tested positive were pooled and lyophilized and subsequently analyzed by high resolution $^1H$ NMR spectroscopy in $D_2O$. The modified HA fragments were isolated as white fibrous materials in approximately 80–86% yield.

Three commercially available dihydrazides:

1a. succinic
1b. adipic
1c. suberic were attached the HA backbone fragments as follows:

(1a): HA tetrasaccharide (15 mg, 0.036 mmol) was subjected to a coupling reaction with succinic dihydrazide. The molar equivalency ratio of HA:succinic dihydrazide:EDC was 1:30:4. The reaction was conducted at 50° C. to improve succinic dihydrazide solubility in water. The recovery of modified HA after gel filtration chromatography was 13.0 mg (86% recovery). The modified sample (2 mg) was dissolved in 500 μL of $D_2O$ for $^1H$ NMR studies. The purified product was studied by $^1$NMR spectroscopy of $D_2O$ at 600 MHz. The assignments were made by comparison of the modified HA spectrum to unmodified HA spectrum to unmodified HA on the one hand and to unmodified HA mixed with succinic dihydrazide on the other. The linker proton assignments are: $^1H$ NMR ($D_2O$) δ2.50–2.80 (m, 4H, —NH—NH—C(O)—$CH_2CH_2$—C(O)—NH—$NH_2$). The degree of coupling was estimated to be 30% by NMR integration under the employed experimental conditions.

(1b): HA hexasaccharide (10 mg, 0.025 mmol) was subjected to a coupling reaction with adipic dihydrazide at room temperature. The equivalency ratio of HA:adipic dihydrazide:EDC was 1:40:4. The recovery of modified HA after gel filtration chromatography was 8.0 mg (80% recovery). The purified product was studied by $^1H$ NMR spectroscopy in $D_2O$ at 600 MHz. $^1H$ NMR assignments were made as described for the previous sample. $^1H$ NMR ($D_2O$) δ2.29–2.31 (t, 2H, J =6.3 Hz, —NH—NH—C(O)—$CH_2$), 2.16–2.25 (t, 2H, J =6.4 Hz, —NH—NH—C(O)—$CH_2$), (2.11–2.15(m, 2H, —$CH_2$—C(O)—NH—$NH_2$), 1.53–1.54 (m, 2H, —$CH_2$—$CH_2$—$CH_2$C(O)—NH—$NH_2$), 1.55 1.57 (m, 2H, —$CH_2$—$CH_2$—C(O)—NH—$NH_2$).

Figure 1B:
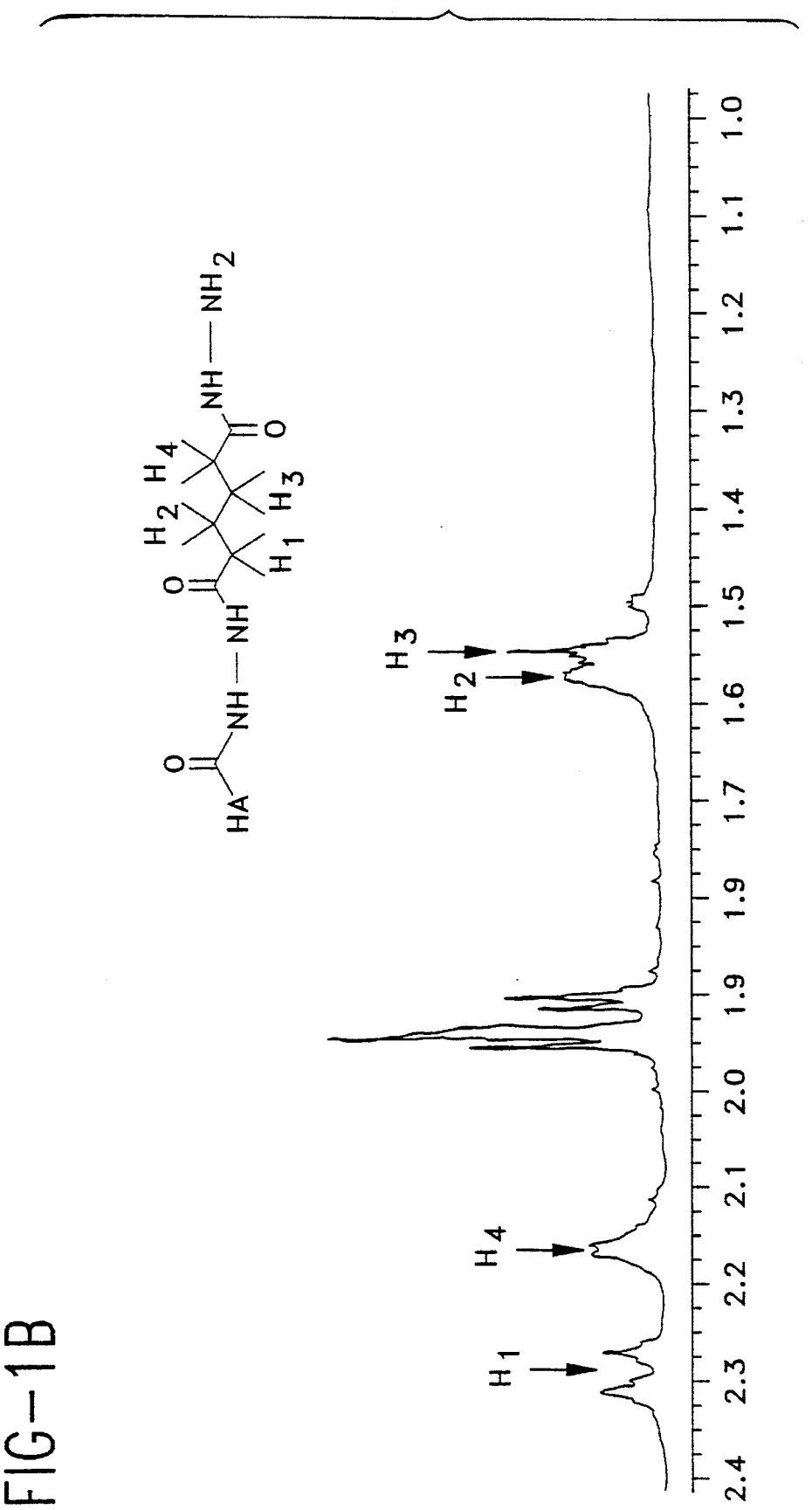

Analysis of the $^1H$ NMR spectrum of HA-adipate 1b (FIG. 1B) suggested that adipic dihydrazide was covalently bound to the HA backbone without any appreciable crosslink formation. This conclusion is based on proton NMR evidence. The admixture of HA hexasaccharide with adipic dihydrazide in the absence of carbodiimide (FIG. 1A) showed two broad multiplets in a 1:1 ratio. The upfield multiplet contained the internal methylene ($H_2,H_3$) protons of adipic dihydrazide, while the downfield multiplet comprised the $H_1$ and $H_4$ methylene protons. Upon covalent attachment to the HA backbone splitting of these peaks was observed; the methylene protons ($H_1$) in the dihydrazide linkage became distinguishable from the terminal methylene protons ($H_4$). Moreover, the $H_1$ protons become diastereotopic as a result of restricted rotation. The upfield multiplet centered at δ=1.55 ppm also looses its degeneracy and resolves into separate resonances for the the ($H_2$) and ($H_3$) methylenes. These assignments could be made unambiguously by observing cross peaks in a double quantum filtered COSY experiment (data not shown). The absence of symmetrical peaks at a detectable level strongly suggests that crosslinking is not occurring during the hydrazide functionalization. This conclusion is confirmed by subsequent chemical reaction as described below. The degree of coupling was determined by integration of the linker peaks ($H_4$) against the methyl peaks (δ=1.85–1.95 ppm) of the acetamido moiety of the N-acetyl-D-glucosamine residue of known fragments of HA. Under the employed experimental conditions integration of the NMR spectrum suggested a 56% coupling of adipic dihydrazide to the HA hexasaccharide. That is, approximately 1.6 carboxylates (out of 3.0) per hexasaccharide are modified.

(1c): HA octasaccharide (10 mg, 0.025 mmol) was subjected to the coupling reaction with suberic dihydrazide. The molar ratio of hyaluronic acid octasaccharide/suberic dihydrazide was 1/30. The ratio of HA/EDC was 1/2.5. The reaction was run at 70° C. to promote the solubility of suberic dihydrazide in water. The recovery of modified HA after gel filtration chromatography was 8.0 mg (80% recovery). $^1H$ NMR assignments were made as described for 1a and 1b. $^1H$ NMR ($D_2O$) δ2.25–2.28 (t, 2H, J=7.3 Hz, —NH—NH—C(O)—$CH_2$—), 2.16–2.25 (t, 2H, J =7.4 Hz, —NH—NH—C(O)—$CH_2$—),(2.11–2.15(m, 2H, —$CH_2$—C(O)—NH—$NH_2$), 1.53–1.58 (m, 2H,—NH—NH—C(O)—$CH_2$—$CH_2$), 1.49–1.51 (t, 2H, J=7.5 Hz, —$CH_2$—$CH_2$—C(O)—NH—$NH_2$), 1.24–1.27(m, 4H, —$CH_2$—$CH_2$—$CH_2$—$CH_2$—C(O)—NH—$NH_2$).

EXAMPLE a. Synthesis of N-succinimidyl Ibuprofen (2). Ibuprofen was selected as a model for a non-steroidal anti-inflammatory drug. Ibuprofen (100 mg, 0.484 mmol) was dissolved in 2 mL dry 1,2-dimethoxyethane. To this mixture was added an equimolar amount of N-hydroxysuccinimide (56.0 mg, 0.484 mmol). The reaction mixture was cooled down to 4° C. and dicyclohexylcarbodiimide (DCC) (99.0 mg, 0.484 mmol) was added to the mixture. The reaction was stirred 12 hours at 4° C. and worked up filtering of the urea byproduct and subsequently concentrated by rotary evaporation yielding 120 mg of the NHS ester of Ibuprofen. The compound was used without any further purification in the coupling reaction with hydrazido modified HA.

b. The NHS-derivative of Ibuprofen was coupled by hydrazido-HA 1b in 0.1M NaHCO$_3$ buffer at pH=8.50 using DMF as a cosolvent to provide Ibuprofen linked to HA through a hydrazide bond after purification by gel filtration chromatography on Biogel P-2 using water as eluant (Scheme 5). The HA-Ibuprofen complex 3 was characterized by $^1$H NMR in D$_2$O at 600 NMz. The characteristic phenyl peaks of Ibuprofen were observed in the $^1$H NMR spectrum at δ=7.25 ppm providing unambiguous proof for the formation of the HA-Ibuprofen complex 3. The UV spectrum of the complex showed a $\lambda_{max}$ at 266 nm. The degree of coupling of Ibuprofen to HA was determined to be 29% based on UV data.

a. Hydrocortisone-hemisuccinate (100 mg, 0.216 mmol) was dissolved in 2 mL of DMF. To this mixture was added N-hydroxysuccinimide (25.0 mg. 0.216 mmol). Next dicyclohexylcarbodiimide (45.0 mg, 0.216 mmol) was added to the mixture and the reaction was allowed to stir at room temperature for 16 hr. For workup the precipitated dicyclohexylurea (DCU) was filtered and the mixture was concentrated by rotary evaporation. The NHS derivative was used without any further purification in the coupling reaction with hydrazido functionalized HA.

b. The hydrocortisone hemisuccinate-NHS-ester derivative 4 was then coupled to hydrazido-HA 1b in 0.1M NaHCO$_3$ buffer (pH=8.50) using DMF as a cosolvent (Scheme 6). The HA-hydrocortisone 5 complex was purified by gel filtration chromatography on Biogel P-2, and studied by $^1$H NMR in D$_2$O at 600 MHz. Peaks that are characteristic of the hydrocortisone moiety appear at δ=0.05, 1.41, and 5.80 ppm. The UV spectrum of the complex 5 shows a $\lambda_{max}$ at 246 nm. The amount of hydrocortisone attached to the HA backbone was estimated by UV to be 25%.

SCHEME 5

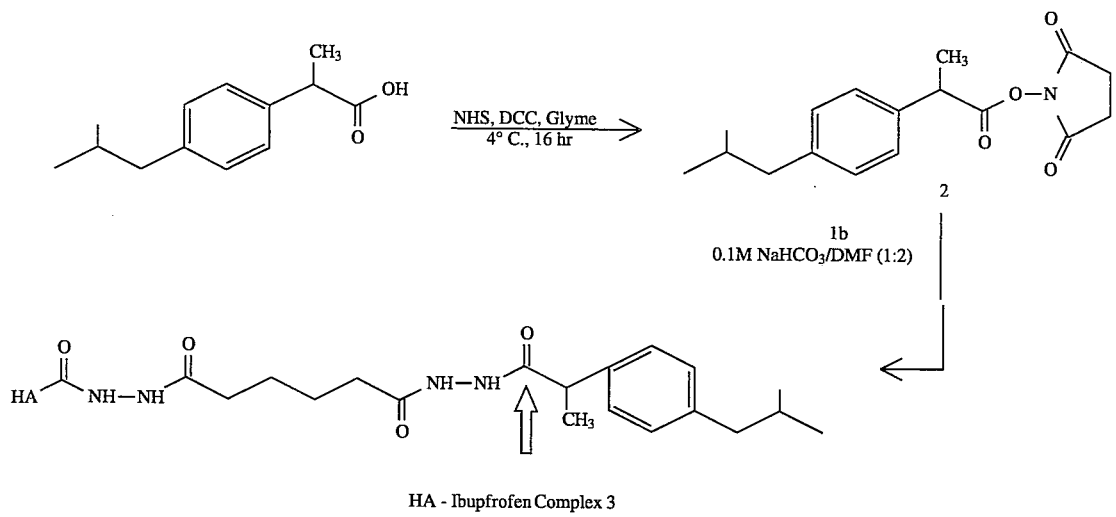

HA - Ibupfrofen Complex 3

EXAMPLE 3

Synthesis of N-succininmidyl hydrocortisone-hemisuccinate (4). Hydrocortisone hemisuccinate was selected as a prototypical steroidal anti-inflammatory drug.

SCHEME 6

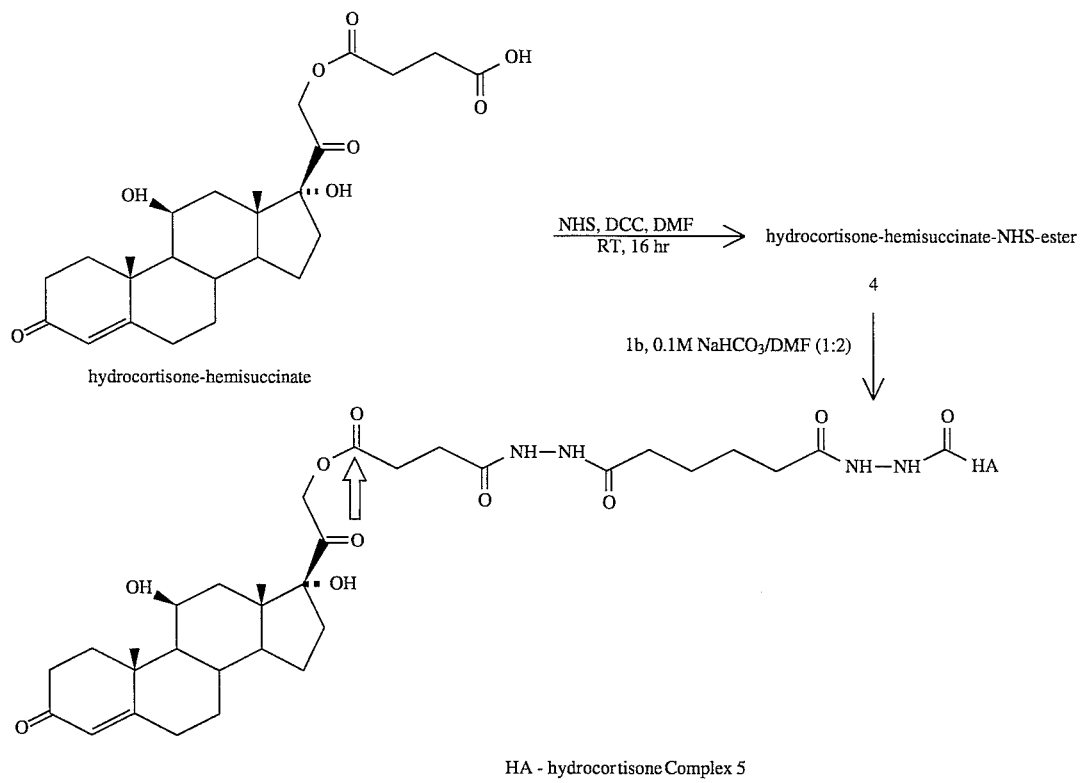

EXAMPLE 4

Crosslinking of HA. The presence of a reactive hydrazido moiety on the HA backbone enabled the introduction of a variety of covalent reversible and irreversible crosslinks between individual HA strands using commercially available amine-specific homobifunctional crosslinkers such as those shown below as 4a, b, c, and d. These commercially available amine-specific homobifunctional crosslinkers are identified as follows:

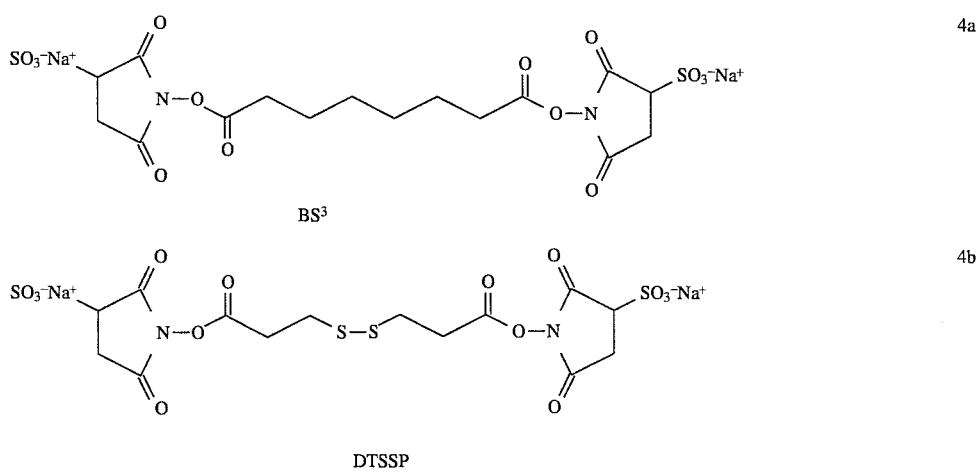

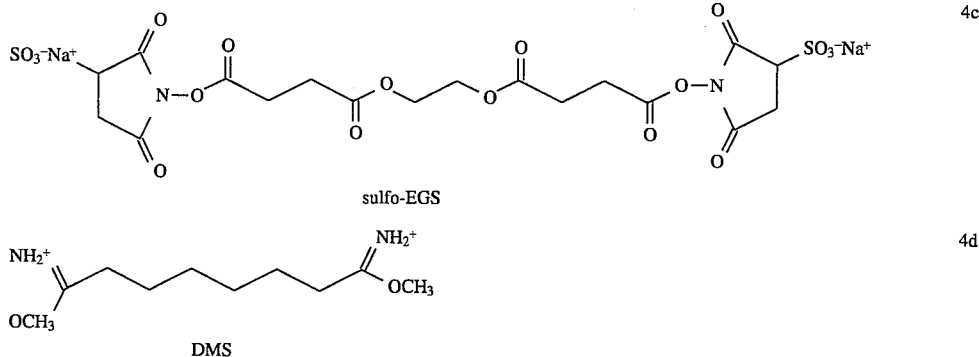

sulfo-EGS

DMS

General procedure for crosslinking of hydrazidofunctionalized HA with homobifunctional crosslinkers. Hydrazido-functionalized HA fragments were dissolved in 0.1M NaHCO$_3$ buffer at a concentration of ca. 1–50 mg/mL. The preferred concentration of 4–20 mg/mL was chosen to maximize the number of interstrand crosslinks as opposed to intrastrand crosslinks that would be favored under more dilute conditions. To this mixture was added a slight molar excess of the homobifunctional crosslinker in solid form. The equivalency ratios of hydrazido-HA: crosslinker were typically in the range of 1:2 to 1:10. The homogeneous reaction mixture was allowed to stir at room temperature for 16–18 hr. For workup the reaction mixture was applied directly to a column of Biogel P-2(30×1.5 cm) and chromatographed using water as eluant at a flow rate of 30 mL/hr. Typically 40 fractions of 2mL each were collected and assayed for glucuronic acid content using the carbazole method. Fractions that tested positive were pooled, lyophilized, and subsequently analyzed spectroscopically by $^1$H NMR in D$_2$O at 600 NMz.

Crosslinked Products of adipic dihydrazide functionalized HA with homobifunctional crosslinkers (6)–(9).

The above-described procedure was adopted in preparing crosslinked derivatives of HA from adipic dihydrazide functionalized HA lb. The details of the individual reactions and the spectroscopic results as follows:

(6): Hydrazido-functionalized HA (6.0 mg, 0.02 mmol) was dissolved in 1 mL 0.1M NaHCO$_3$(pH=8.50). The molar ratio of hydrazido-HA/BS$^3$ was 1.0/7.0. The recovery of crosslinked HA after gel filtration chromatography was 4.8 mg (80% recovery). The sample was dissolved in 500 μL of D$_2$O for spectroscopic analysis. Diagnostic peaks from the cross-linker ("X-linker") that do not overlap with the HA resonances are reported. $^1$H NMR (D$_2$O) δ2.25–2.50 (m, 12H, all CH$_2$—C(O)—NH—NH, α—CH$_2$s of linker and X-linker), 1.60–1.80 (m, 12H, all CH$_2$—CH$_2$—CH$_2$—C(O)—NH—NH—, β—CH$_2$s of linker and X-linker), 1.35–1.43 (m, 4H, γ—CH$_2$s of X-linker).

(7): Hydrazido-functionalized HA oligomer (4.0 mg, 0.10 mmol) was dissolved in 0.50 mL 0.1M NaHCO$_3$ buffer. The molar ratio of hydrazido-HA/DTSSP was 1.0/3.5. The recovery of crosslinked HA after purification was 3.20 mg (80% recovery).

(8): Hydrazido-functionalized HA oligomer (3.8 mg, 0.10 mmol) was subjected to the crosslinking reaction. The molar ratio of hydrazido-HA/DMS was 1.0/3.5. The recovery of crosslinked HA after purification was 3.0 mg (79% recovery). $^1$H NMR (D$_2$O) δ2.25–2.56(m, 12H, all CH$_2$—C(O)—NH—NH, and —CH$_2$—C(NH$_2$+), α—CH$_2$s of linker and X-linker), 1.69–1.77 (m, 12H, all CH$_2$—CH$_2$—CH$_2$—C(O)—NH—NH—, β-CH$_2$s of linker and X-linker), 1.31–1.48 (m, 4H, γ—CH$_2$s of X-linker).

(9): Hydrazido-functionalized HA oligomer (3.5 mg, 0.009 mmol) was subjected to the crosslinking reactions. The reaction mixture was allowed to stir at room temperature for 3 hr. The molar ratio of hydrazido-HA/sulfo-EGS was 1.0/4.5. The recovery of crosslinked HA after purification was 2.8 (80% recovery ).

The cross linked HA complexes 6–9 are shown below.

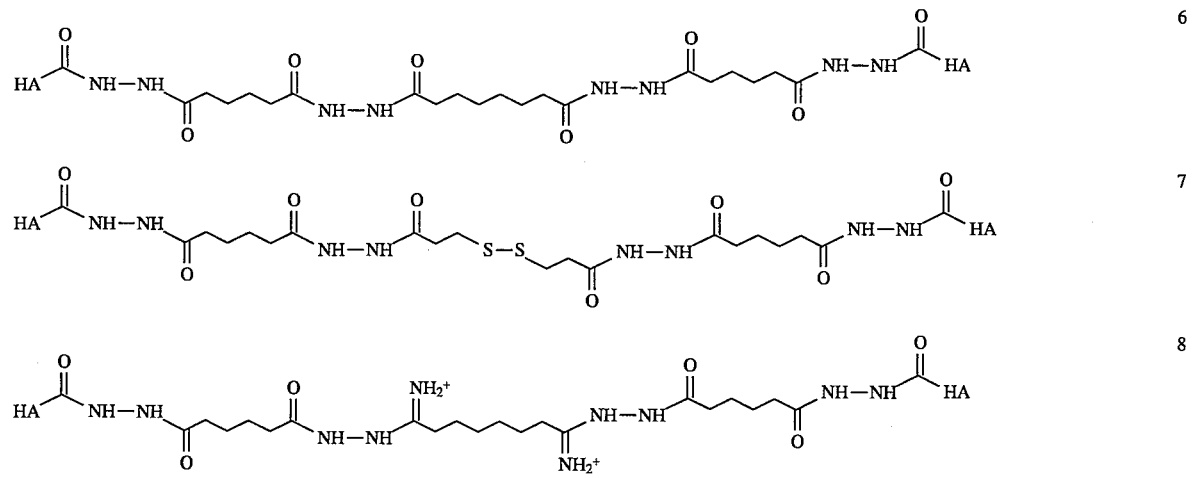

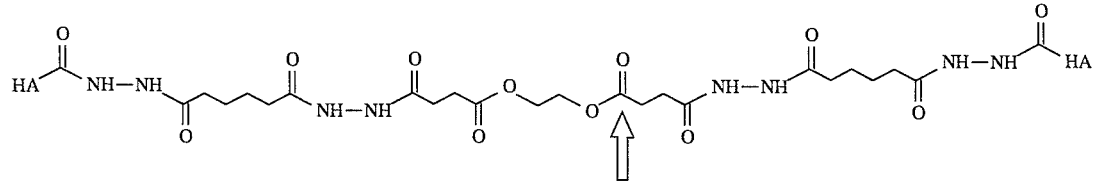

Figure 2:
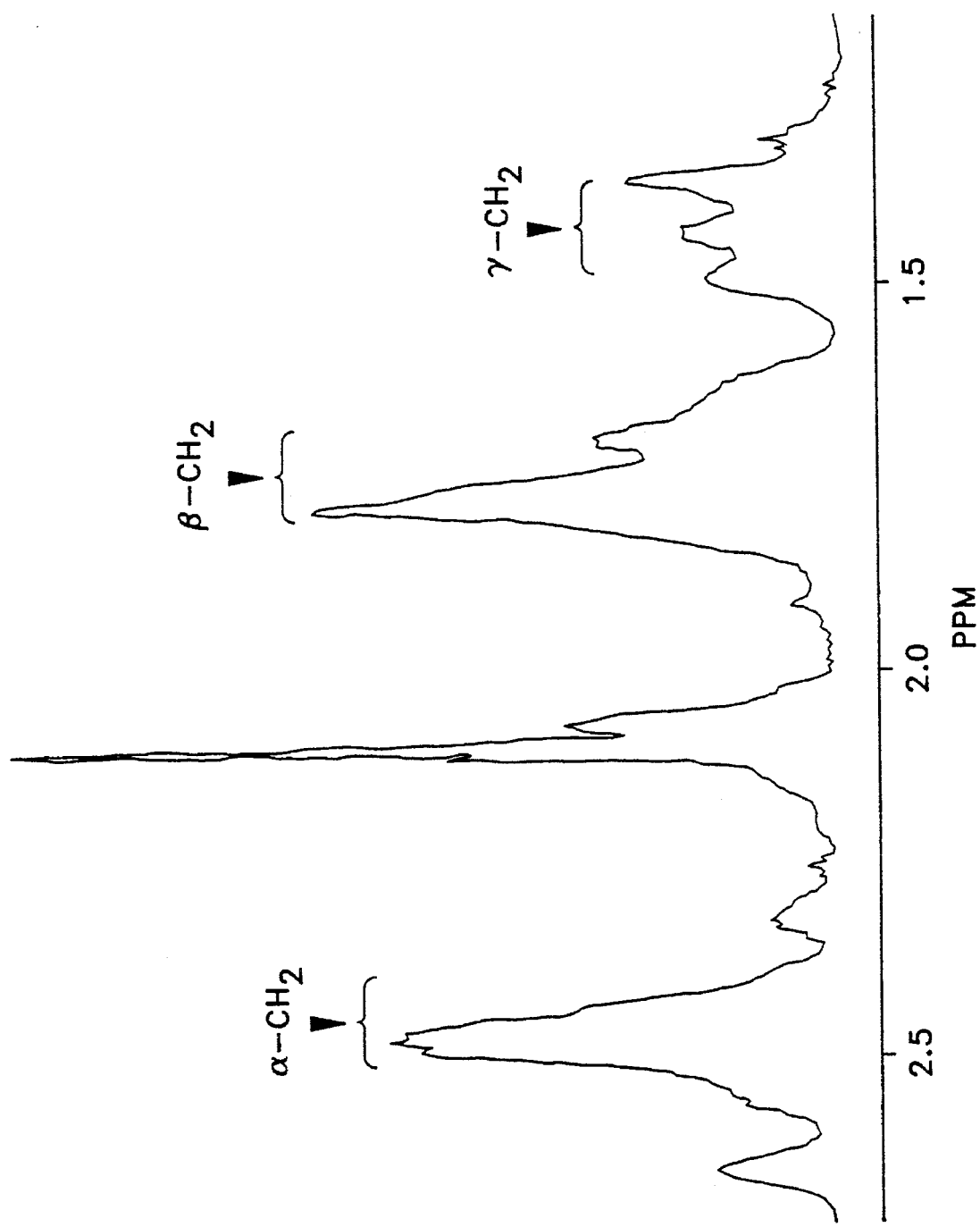
FIG. 2 shows the $^1$H NMR spectrum of hydrazido-HA crosslinked with DMS which is a product of Example 4.

The crosslinked HA complexes 6–9 were verified by $^1$H NMR in $D_2O$ at 600 MHz. A common feature of the 1H NMR spectra is the downfield shift of the multiplet at $\delta=2.15$ ppm which is assigned to ($H_4$) in lb. Upon covalent binding of the terminal hydrazido group to the homobifunctional crosslinkers ($H_4$) becomes chemically equivalent with ($H_1$) and these peaks now appear as a broad multiplet centered at $\delta=2.50$ ppm. The upfield region of the $^1$H NMR spectrum of hydrazido-HA crosslinked with dimethyl suberimidate (DMS) 8 in $D_2O$ is shown in FIG. 2. The significant degree of line-broadening observed in the region of the sugar ring protons ($\delta=3.20$–4.20)ppm also suggests the formation of a high molecular weight species as anticipated if extensive interstrand crosslinks had formed.

EXAMPLE 5

Functionalization of High Molecular Weight Hyaluronate

High MW sodium hyaluronate (200 mg, 0.5 mmol) was dissolved in water to a final concentration of 4mg/mL. A 40-fold molar excess of adipic dihydrazide (3.5 mg, 20 mmol) was added to the hyaluronate mixture and allowed to dissolve slowly at room temperature. The pH of the reaction mixture was adjusted to below 6 by addition of 1N HCl. To this mixture was added a four-fold molar excess of EDC (382 mg, 2.0 mmol) in solid form. The usual increase in pH associated with this reaction was observed upon addition of EDC to the reaction mixture, and the pH was maintained at below 6 by addition of 0.01N HCl throughout the course of the reaction. The reaction was allowed to proceed for approximately two hours or until no further increase in pH was observed. The pH of the reaction was raised to 7.0 by addition of 1N NaOH to terminate the reaction. Dialysis tubing was prepared by soaking in water at room temperature for 3–4 hr. and subsequently rinsing with $H_2O$. For purification, the reaction mixture was diluted threefold with water, and transferred to pretreated dialysis tubing with a MW cutoff of 3,500 daltons. The mixture was dialyzed exhaustively against water. The hydrazido functionalized hyaluronate was isolated as a white fiber in quantitative yield after lyophilization for 48 hours. The incorporation of the linker and pendant hydrazido moiety were verifed by $^{13}$C solid state NMR using cross polarization and magic angle spinning (CP-MAS). The amount of linker incorporation was determined to be 0.195±0.05 linker per mol. of HA monomer (disaccharide unit).

The product is shown in Scheme 7 below.

SCHEME 7

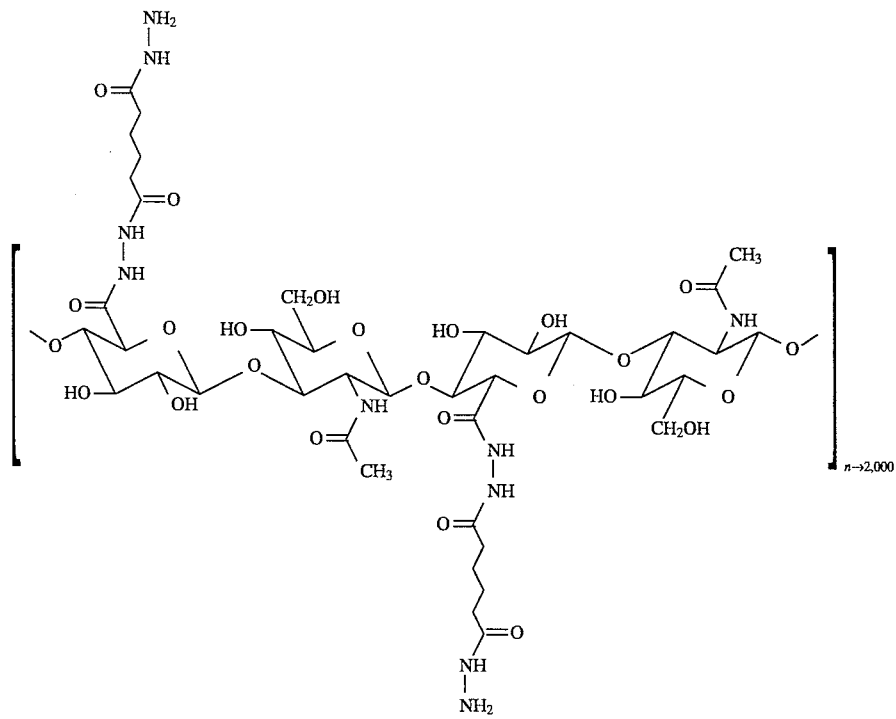

EXAMPLE 6

Crosslinking of High MW HA

The hydrazido-hyaluronate prepared in Example 5 was dissolved in 0.1M NaHCO$_3$ at a concentration of 15 mg/mL to give a clear and colorless solution. The homobifunctional crosslinker BS$^3$ DTSSP sulfo-EGS, and DMS, in solid form were separately added to the solutions. Upon addition of the homobifunctional crosslinkers, gellation (polymerization) was evident after approximately 30–90 seconds. The gels thus formed are shown below in Scheme 8. The gels were washed repeatedly with H$_2$O in order to remove small molecule by-products, and allowed to swell in water for 14 days at 8° C. with repeated water changes so that they reached equilibrium with their environment and no further swelling was observed over time. Typically the gels swelled to approximately 10 time their original volume, a property highly characteristic of hydrogels, or macromolecular networks. Thus, for example, when 70 mg of hydrazido-HA was crosslinked with a slight molar excess of BS$^3$, 50 mL of gel was formed once the gel had reached equilibrium with its environment. The resultant gel then can be said to contain 1.4 mg/mL HA. the water content of the hydrogel HA-BS$^3$ was determined by measuring the difference between the weight of a sample of the gel equilibriated in water for two weeks and the weight of a sample after freeze drying according to the formula, $(W_{wet}-W_{dry})/W_{wet}\times 100\%$. The equilibrium water content of the HA-BS$^3$ gel (2) was found to be 99.86%.

Figure 3:
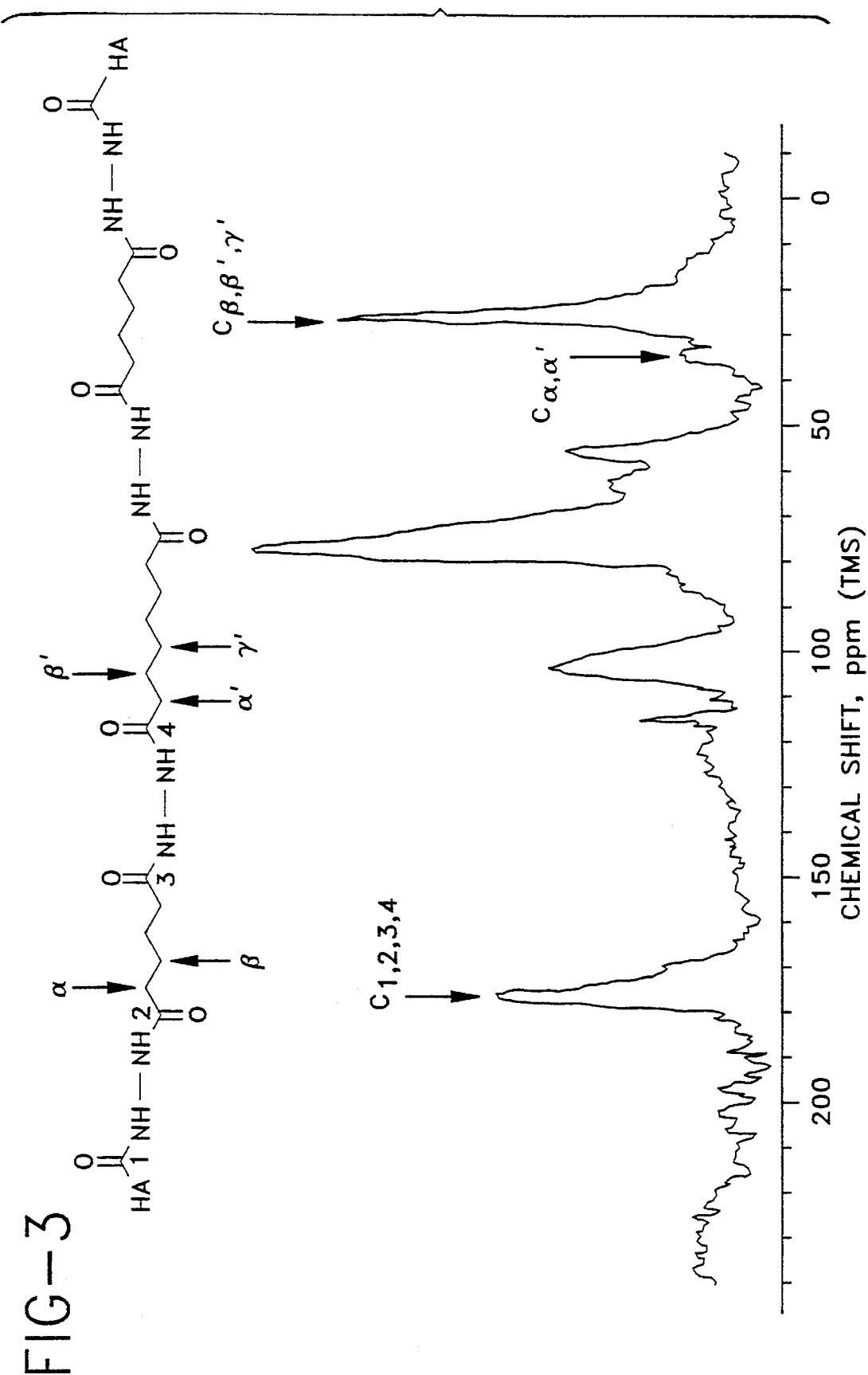
FIG. 3 shows the CP-MAS $^{13}$C-NMR for HA-BS$^3$ prepared in Example 6.

The degree of cross-linking was determined by solid state $^{13}$C NMR to be about 24%. The CP-MAS $^{13}$C-NMR for HA-BS$^3$ is shown in FIG. 3.

The molar ratios of hydrazido-hyaluronate and homo-functional cross-linkers were as follows:

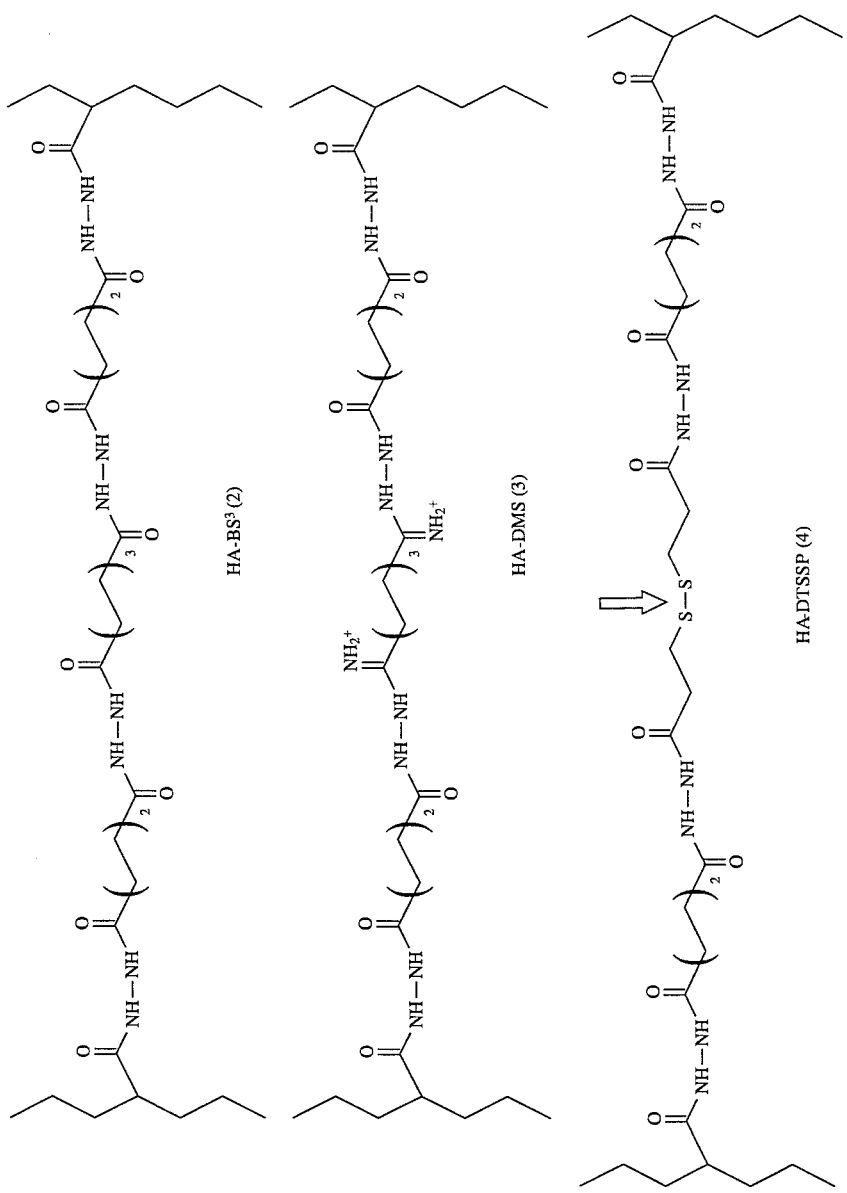
Scheme 8
The hyaluronate derived hydrogels. The arrows indicate the potential cleavage sites.
Hydrazido-HA:BS³ ⟶ 1:1.4
Hydrazido-HA:DTSSP ⟶ 1:1.4
Hydrazido-HA:DMS ⟶ 1:1.4
Hydrazido-HA:sulfo-EGS ⟶ 1:0.36
HA-BS³ (2)
HA-DMS (3)
HA-DTSSP (4)

-continued
Scheme 8
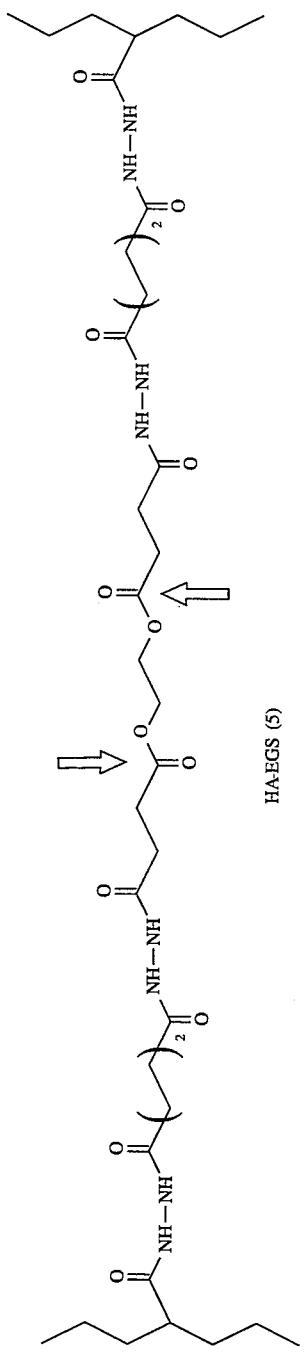
HA-EGS (5)
The hyaluronate derived hydrogels. The arrows indicate the potential cleavage sites.

EXAMPLE 7

Comparative Example

A control experiment was run in parallel to the crosslinking experiments. Native hyaluronate was dissolved at a concentration of 15 mg/mL in 0.1M NaHCO₃ buffer. Dimethyl suberimidate (DMS) was added to the viscous mixture and allowed to stir at room temperature. No gellation of the solution was observed over time and the mixture components remained completely water soluble indicating that in the absence of hydrazido-functionalized HA no covalent crosslinking had taken place.

EXAMPLE 8

Determination of Surface Morphology of Hyaluronate Hydrogels.

Native HA and the hydrogels prepared in Example 6 were freeze dried, and samples were gold coated and studied by scanning electron microscopy (SEM). The electron micrographs showed that the crosslinked hyaluronate derivatives prepared in Example 6 exhibited highly porous and sheetlike structures with pores ranging in size from 20–100 μm. In contrast, the native hyaluronate was irregular and fibrous.

This supports the inventive formation of highly porous, three-dimensional networks in the crosslinked hyaluronate. Furthermore, the choice of crosslinker can influence the morphology. The use of BS³ resulted in elongated pores with predominantly sheet-like structure. The use of DTSSP resulted in relatively uniform, continuous pore structure. The use of EGS resulted in discontinuous pore structure. The use of DMS resulted in relatively uniform pore structure with pore size in the range of 20–50 μm.

Figure 4C:
FIG. 4 shows SEM of a cross-linked HA hydrogel of Example 8.
Figure 4D:
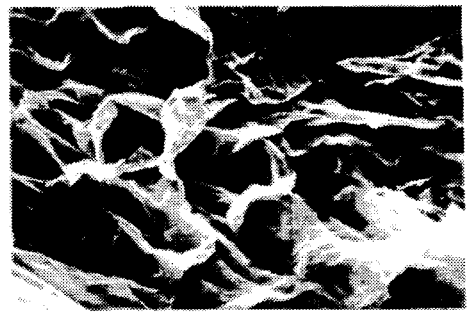

The transition from a disordered random structure in native HA to an ordered macroporous structure in hydrogels was clearly demonstrated. This can be deduced from FIG. 4, which shows SEM of 2 crosslinked HA hydrogels (after freeze-drying): A and B, HA-DMS; C and D, HA-BS³.

What is claimed:

1. A composition of matter comprising hyaluronate functionalized with a dihydrazide at glucuronic acid sites of the hyaluronate.

2. The composition of matter of claim 1 wherein the hyaluronate has an average molecular weight of from about 400 to about 10,000,000 Daltons.

3. The composition of matter of claim 1 wherein the dihydrazide has the formula:

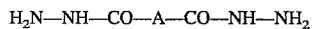

wherein A is a substituted hydrocarbyl, unsubstituted hydrocarbyl, substituted heterocarbyl or unsubstituted heterocarbyl moiety, said moiety having one to 20 carbons or heteroatoms.

4. The composition of matter of claim 3 where the heteroatoms are selected from the group consisting of nitrogen, oxygen or sulfur.

5. The composition of matter of claim 1 wherein the hyaluronate functionalized with dihydrazide is cross-linked.

6. The composition of matter of claim 5 wherein a cross-linking agent is an aminespecific homobifunctional linker.

7. A composition which comprises the composition of matter of claim 5 and an additional component comprising cells for tissue engineering, a cosmetically acceptable agent or pharmaceutically acceptable agent, said additional component suspended in a cross-linked hyaluronate functionalized with dihydrazide.

8. The composition of matter of claim 1 wherein an additional component comprising cosmetically acceptable agent or pharmaceutically acceptable agent or cells with bioadhesive is covalently bonded to a terminal amino reactive group of the dihydrazide.

9. The composition of claim 8 wherein the composition of matter is cross-linked before or after covalent bonding of the additional component.

10. A composition which comprises the composition of matter of claim 1 and an additional component comprising cells for tissue engineering, a cosmetically acceptable agent or pharmaceutically acceptable agent said additional component associated hydrophobically or electrostatically with the hyaluronate functionalized with dihydrazide.

11. The composition of claim 10 wherein the composition of matter is cross-linked before or after the association of the additional component.

12. A composition comprising the composition of matter of claim 1 and an additional component which comprises cells for tissue engineering.

13. A composition comprising the composition of matter of claim 1 and an additional component which comprises one or more cosmetically acceptable agents.

14. The composition of claim 13 wherein the cosmetically acceptable agent is selected from the group consisting of fatty acids, topical medicaments, UV absorbing agents, and perfumes.

15. A composition comprising the composition of matter of claim 1 and an additional component which comprises one or more pharmaceutically acceptable agents.

16. A composition comprising a pharmaceutically effective amount of the composition of claim 15 together with a pharmaceutically acceptable carrier, excipient or diluent.

17. The composition of claim 15 wherein the pharmaceutically acceptable agent is selected from the group consisting of anti-inflammatories, spermicides, anti-bacterials, anti-vitals, anti-fungals and anti-proliferatives.

18. A composition comprising a pharmaceutically effective amount of the composition of claim 17 together with a pharmaceutically acceptable carrier, excipient or diluent.

19. The composition of claim 15 wherein the pharmaceutically acceptable agent is a peptide.

\* \* \* \* \*